Sept. 22, 1936. E. A. HANAN 2,055,289
LOCK FOR VEHICLE HOODS
Filed May 22, 1935
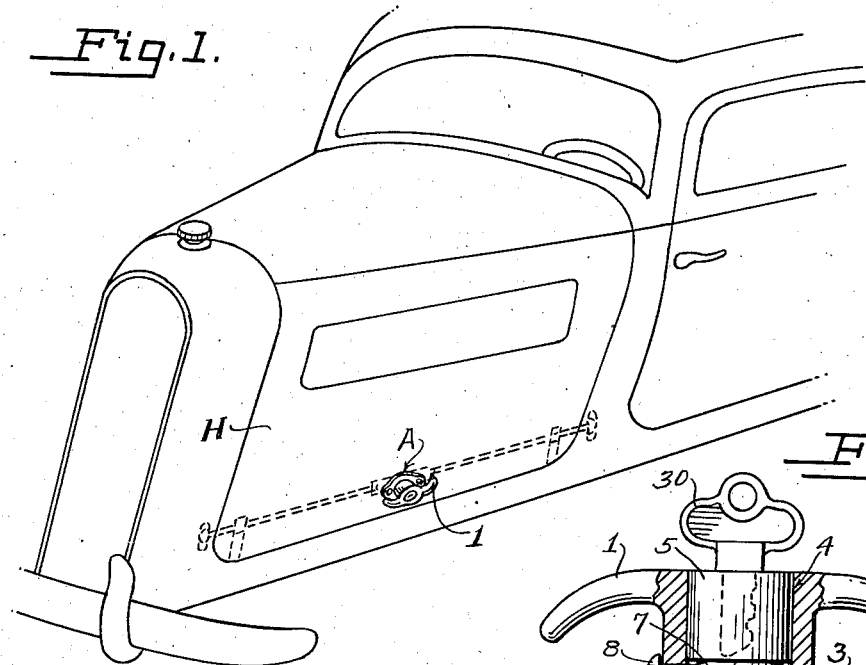
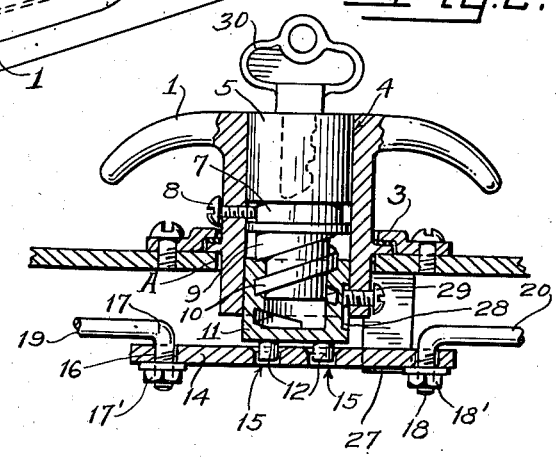
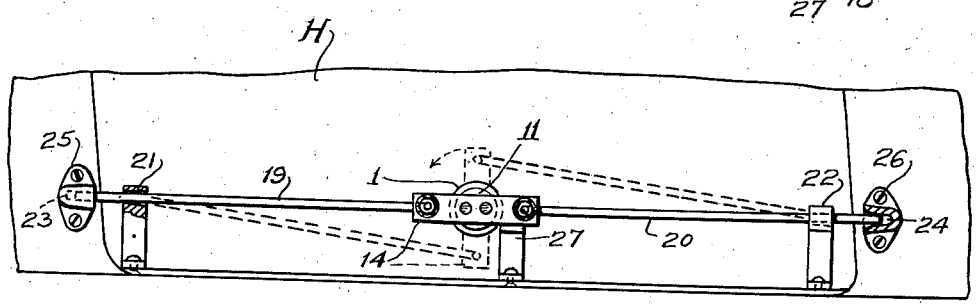
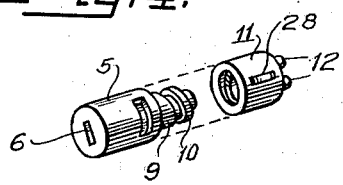
Edward A. Hanan
INVENTOR.

Patented Sept. 22, 1936

2,055,289

UNITED STATES PATENT OFFICE 2,055,289

LOCK FOR VEHICLE HOODS

Edward Arthur Hanan, Beverly Hills, Calif.

Application May 22, 1935, Serial No. 22,721

1 Claim. (Cl. 70—14)

My present invention relates to a novel and practical device for locking the hood of an automotive vehicle, or the like, in closed position to protect the valuable property covered thereby. Many motorists have had the unpleasant experience of leaving their cars parked at curbs, or on parking lots or garages managed by unscrupulous persons, and returning to find their spark plugs have been stolen or interchanged with inferior plugs.

A further advantage of locking the hood is to make inaccessible the radiator cap which on many new cars is located under the hood. My new invention will thus discourage car stealing since the thief will be unable to put in water or oil.

My new and novel hood lock may be used on any suitable type of vehicle and due to its simple and practical construction may be built on new cars or attached to old ones. A simple turn of the key is required to operate the device.

Many other novel uses and advantages of my device will become apparent from the foregoing specification and the drawings.

Fig. 1 is a perspective view of a vehicle hood showing my novel hood lock in position.

Fig. 2 is a horizontal section showing my device in locked position.

Fig. 3 is a fragmentary elevation looking at the inside surface of the hood and showing the locked position.

Fig. 4 is an exploded perspective showing the cylinder and the nut.

In the drawing, Figure 1 shows an automobile hood having a cover H which is provided with an aperture A to receive the handle 1. The handle is provided with hand grips 2 and is rotatably fastened to the hood cover by means of plate 3.

The handle is provided with a cylindrical bore 4, adapted to receive a cylinder 5 having suitable locking mechanism therein, accessible through slot 6.

The cylinder 5 is provided with a groove 7, coacting with set-screw 8 to prevent axial movement of the cylinder.

The cylinder is reduced as at 9 and suitably threaded at 10. An internally threaded nut or clutch sleeve 11 is supported in the bore 4 adjacent the cylinder 5 and has prongs 12 on its exposed face.

A lever 14 is positioned adjacent the nut 10, and has apertures 15 disposed in alignment with the prongs 12. The lever 14, adjacent its free ends is provided with apertures 16 to freely receive the angularly disposed ends 17 and 18 of rods 19 and 20. The lever 14, when disconnected from the lock, is supported by bearing brackets 21, 22 and 27 together with the plates 25, 26.

The rods 19 and 20 are supported adjacent their free ends in guide brackets 21 and 22 mounted on the hood cover, and in locked position, their free ends are locked in recesses 23 and 24 of keepers 25 and 26.

In the operation of my device, when it is necessary to leave the car where some unauthorized person might tamper with the parts under the hood, a key 30 is inserted in the slot 6 to operate the lock and bring the parts into locked position as shown in Figs. 3 and 4.

The key will turn cylinder 5 and threaded element 9, and thus the clutch sleeve 11, which is prevented from turning by reason of slot 28 and set-screw 29, will be advanced until prongs 12 are guided into apertures 15.

A turn of the handle 1 will swing the lever 14 from the dotted or unlocked position of Fig. 3, into the locked position. Bracket 27 serves as a support for lever 14 when the rods 20, 20 are engaged in the keepers 25, 26 as shown in Fig. 3.

From the foregoing it will be observed that I have provided a locking mechanism for the cover of an automobile hood; that when the automobile is moving, the clutch sleeve 11 is held retracted from the lever 14 and is retained in spaced relation thereto whereby vibrations of the automobile are not transmitted to the lock, and that the rods 20, 20 and the lever 14 will be supported in horizontal alinement by the brackets 21, 22 and 27; and that when the automobile is at rest and it is desired to open the hood, the clutch sleeve 11 is first moved into interlocking engagement with the lever 14 by the key 30, and the handle 1 is then turned to swing the lever 14 to a vertical position and thereby effect a withdrawal of the rods 20, 20 from their keepers 25, 26, and that the lever 14 will be then supported entirely by the clutch sleeve 11 and the rods 20, 20 will be supported by the lever and the brackets 21, 22.

It is apparent from the foregoing that I have invented a novel, practical hood lock that may be built into new cars or attached to old ones.

I reserve the right to make changes in the size, shape and arrangement of the parts within the scope of the invention as defined by the claim.

What I claim is:

In a locking mechanism for automobile hood covers, the combination of a lever, locking rods pivotally connected at their inner ends to the outer ends of said lever for reciprocation by said lever into and out of keepers mounted on the hood, guiding means for the rods mounted on the hood cover, a handle rotatably mounted on the cover and having a shank spaced from said lever, a clutch sleeve mounted in the handle shank for rotation therewith and projectable across the space between the handle shank and the lever to effect interlocking engagement and disengagement with said lever, and key-operated means mounted within the handle and having threaded connection with the sleeve for moving the latter into and out of said interlocking engagement with the lever, said lever being supported by said clutch sleeve when said rods are retracted from the keepers.

EDWARD ARTHUR HANAN.